CONTINUOUS CHAIN PRESS
Filed Nov. 4, 1958 5 Sheets-Sheet 1
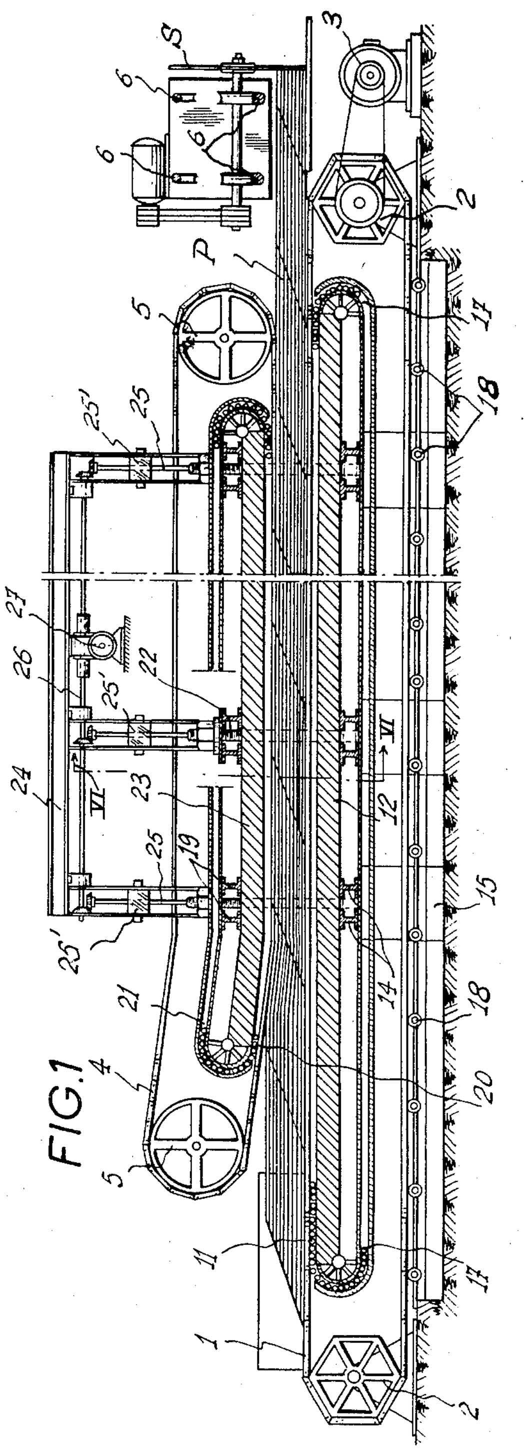

CONTINUOUS CHAIN PRESS
Filed Nov. 4, 1958 5 Sheets-Sheet 2
FIG.6
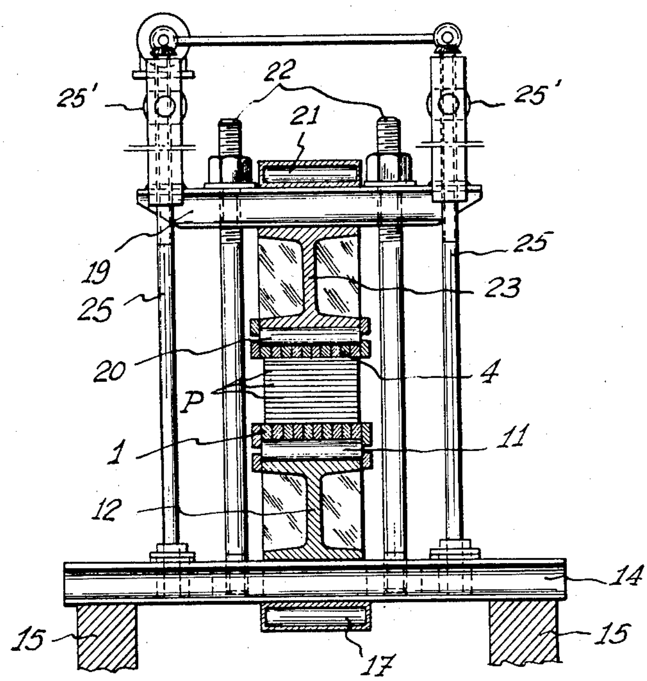
FIG.7
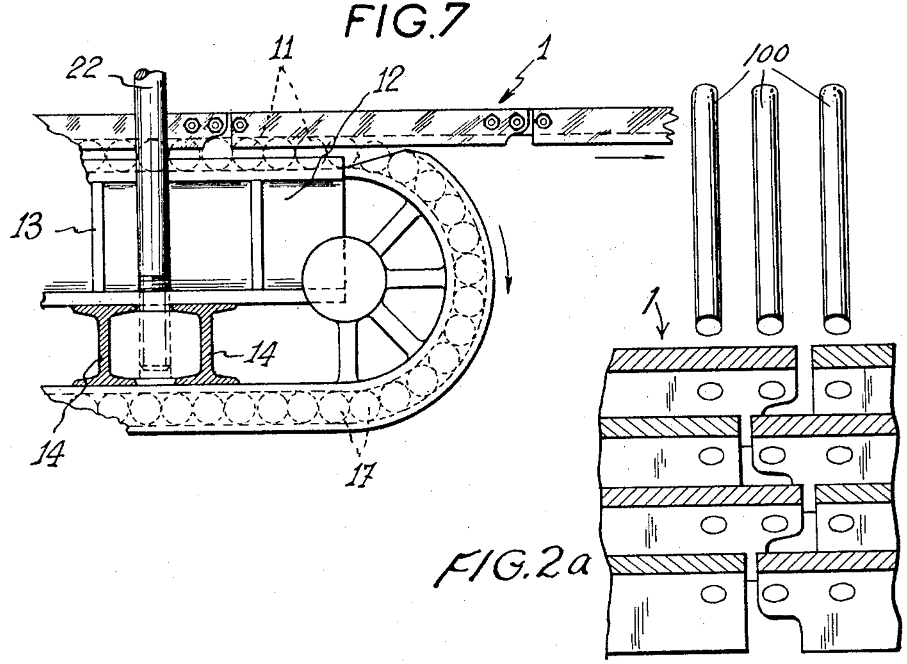
FIG.2a Feb. 11, 1964 R. BURGER 3,120,862
CONTINUOUS CHAIN PRESS
Filed Nov. 4, 1958 5 Sheets-Sheet 3
Fig. 8
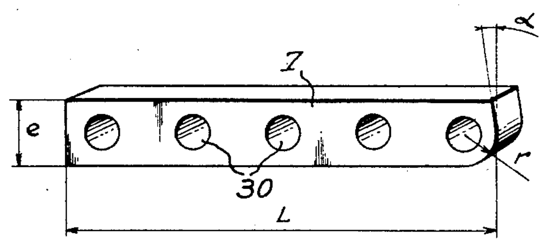
Fig. 9
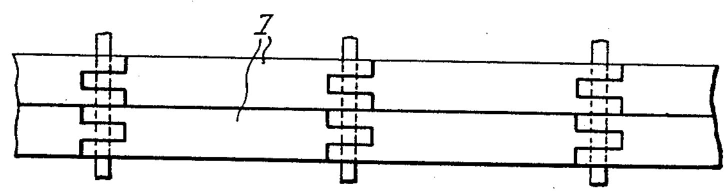
Fig. 10
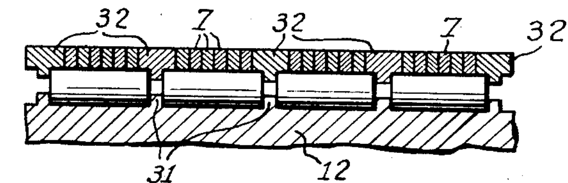
Fig. 11
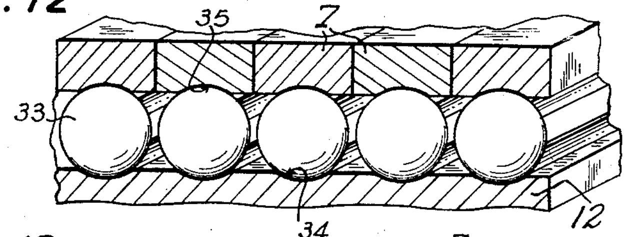
Fig. 12
Fig. 13
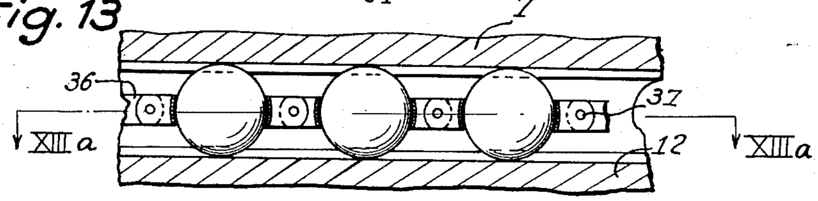
Fig. 13a
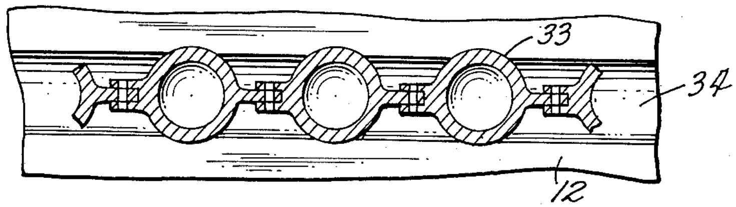

39
11
38
XV
XV 7
11
D
38

Feb. 11, 1964 R. BURGER 3,120,862
CONTINUOUS CHAIN PRESS
Filed Nov. 4, 1958 5 Sheets-Sheet 5
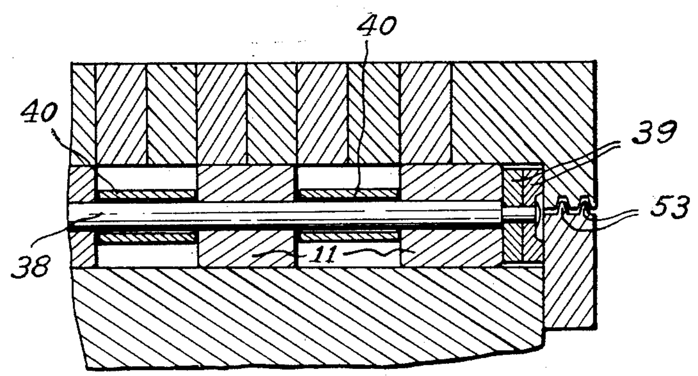

United States Patent Office 3,120,862

Patented Feb. 11, 1964

3,120,862

CONTINUOUS CHAIN PRESS

Raymond Burger, 35 Rue Poincare, Sainte-Marie-aux-Mines, France

Filed Nov. 4, 1958, Ser. No. 771,928
Claims priority, application France Nov. 5, 1957
10 Claims. (Cl. 144—281)

This invention relates to continuous presses of the type serving to produce shaped articles by exerting pressure between a pair of cooperating press surfaces between which the material to be shaped is continuously fed.

A continuous press of this kind may be regarded as a conventional press having a pair of press tables, and wherein the blank stock to be shaped is fed continuously between the press table surfaces transversely to the direction of pressure. A continuous press of the above type comprise means for transmitting the pressure from the press tables to the material being shaped, and means for feeding the material through the press.

Continuous presses of conventional types have generally used for this purpose endless conveyer means, including a lower and an upper conveyer, each endless conveyer being assembled from a series of interpivoted plates movably supported by antifriction bearings carried by the plates in guideways in the press tables. The pressure forces transmitted from the press tables to the conveyer plates generate harmful shear strains across the shafts carrying the antifriction bearings. Such presses are expensive both to construct and maintain.

In other types of continuous presses heretofore used, the conveyer plates are arranged to roll on independent elements such as trains of rollers interconnected by links. In such presses, the problem of guiding the rollers is solved with complicated and expensive equipment. Moreover, the movement of the plates along the machine is produced by a separate device formed by a train of rack sections. These rack sections are pushed into the press by rotation of a gear mounted ahead of the press and meshing with the rack sections. This drive system is complicated and expensive and, moreover, is only suitable in connection with slow speeds and moderate pressures.

In yet another conventional type of interpivoted plate press, the means for supporting and driving the plates is in the form of rollers mounted in bearings on the plates. Such a design is only feasible for relatively low values of pressure.

Continuous presses have further been proposed using endless conveyer belts which are arranged to slide directly over the press table surfaces, or over independent roller means.

The tension forces exerted by the cylindrical drums or sheaves supporting the ends of the conveyer belt are in the above type of press, determined by the magnitude of the steel-to-steel friction coefficient. This requires a relatively high tension force to be imparted to the belts, so that the range of usefulness of this type of device is very restricted. This is especially true since there is no means provided for preventing lateral deviation of the conveyer belts which is inevitable in presses of great length.

It will be clear, from the foregoing, that continuous presses heretofore available are high in cost, and relatively unsatisfactory in operation, especially at higher pressures.

It is therefore an object of this invention to provide a continuous press which eliminates the above and other drawbacks inherent in conventional presses while being operable at pressures very considerably higher than heretofore available.

A continuous press according to the invention, for the shaping of material by application of pressure by a pair of press tables against a pair of cooperating surfaces between which said materials is continuously fed, comprises:

two endless chain conveyers, each comprising a series of links of generally rectangular configuration, with the upper leaf surface of a lower one of said conveyer chains and the lower leaf surface of an upper one of said conveyer chains defining between them the cooperating press surfaces; and two sets of anti-friction or roller elements freely interposed between each of said cooperating surfaces and the adjacent press table, so as to roll freely against both the chain surface and the press table surface, lateral guiding means for the antifriction elements being provided both on the chain surface and on the press table surface.

The anti-friction elements may be rollers, or equivalent elements, having their axes at right angles relative to the direction of chain feed. Alternatively, the anti-friction elements may comprise balls. The pressures are continually transmitted from the press tables to the chain links along diametric lines extending through the anti-friction elements. The anti-friction elements are preferably provided in closely spaced relationship.

The endless chains can be considered to possess a dual function. They first serve to apply to the material being processed the pressures developed by the press tables while preventing the creation of substantial shear stresses and while preventing sag of the chains between the lines of pressure transmission through said elements. The chains further serve to impart the feed displacement to the material, for which purpose at least one of the chains is driven by means of suitable drums or sheaves, preferably of polygonal peripheral shape. It will be understood that, in this way, movement may be imparted to the material without requiring high chain tensoin for driving the chain, and that the tension exerted by the drums is distributed between all of the chain links, thereby greatly reducing wear at the link pivots.

The above and further objects, advantages and features of the invention will appear from the ensuing more detailed description of a continuous chain press according to the invention as illustrated in the accompanying drawings wherein:

FIGURE 1 is a side elevational view of a continuous press;

FIGURE 2 is a perspective view of part of an endless chain unit and a train of supporting rollers used in the press of FIGURE 1;

Figure 14:
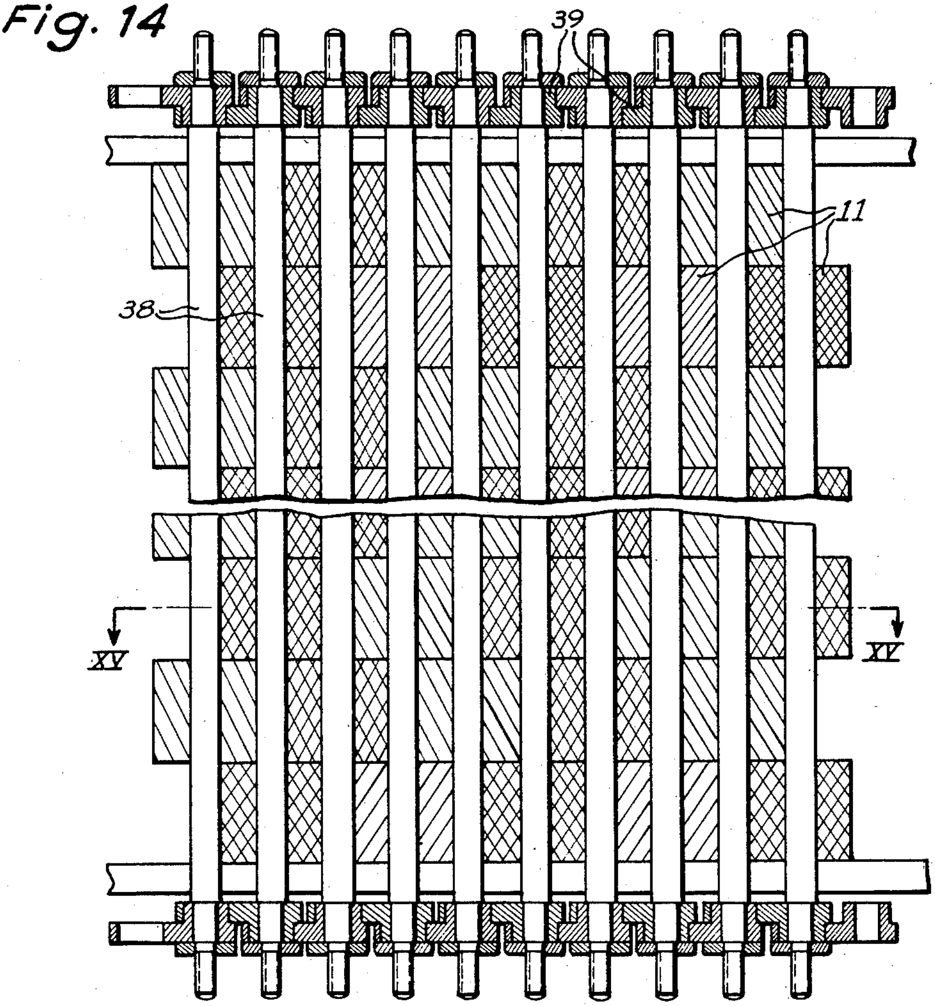
Figure 15:
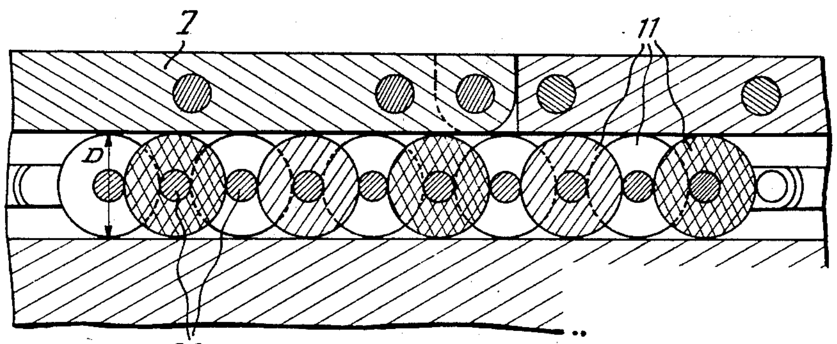

FIGURE 2*a* is a side view from above of a part of the lower chain in which the links are shown in spaced fashion to facilitate an understanding of the manner of assembly of the chain;

FIGURES 3 and 3*a* show links of the lower chain unit;

FIGURES 4 and 4*a* show links of the upper chain unit;

FIGURE 5 shows the end-to-end assembly of two plies forming one layer in a wooden laminate formed by the continuous press shown;

FIGURE 6 is a cross section on an enlarged scale along the line VI—VI of the press shown in FIGURE 1;

FIGURE 7 is a detail view showing one end of the roller train supporting the lower chain unit in FIGURE 1;

FIGURE 8 is a perspective view of a modified link in a compression chain;

FIGURE 9 is a perspective view of an assembly of links similar to that in FIGURE 8;

FIGURE 10 is a plan view of a modified compression chain;

FIGURE 11 is a transverse cross section showing a modified construction of a press table, roller and compression chain assembly;

FIGURE 12 is a transverse cross-section showing a further modified construction of a press table, balls and compression chain assembly;

FIGURE 13 is a longitudinal section through the press showing a portion of the press table, balls, and chain assembly and wherein there is provided a retainer cage for the balls;

FIGURE 13*a* is a cross-section taken along the line XIII—XIII in FIG. 13;

FIGURE 14 is a plan view of a different construction of the roller train;

FIGURE 15 is a section on line XV—XV of FIGURE 14; and,

FIGURE 16 illustrates, in transverse section, a modified embodiment of the roller elements.

As shown in FIGURES 1 to 6, pressing apparatus according to the invention comprises a press for continuously compressing, between a pair of parallel cooperating surfaces, material such as plywood laminates. The press comprises a pair of endless compression chain units, a lower chain unit 1 which is driven by one of two polygonal end drums 2 which in turn is driven by a motor 3 by way of suitable reduction gearing and an upper chain unit 4 which is not driven but free, and is mounted on the pair of freely rotatable end sheaves 5.

Between the sheaves 5 is driven the stock of plies assembled end-to-end and coated with glue, this stock P forming a tape as long as possible, which, after compression and when it comes out of the machine, may be cut up into laminated wood of the desired length by a saw S actuated by a motor and mounted on channels 6 permitting its transversal displacement.

The drums 2 are shaped in cross section as polygons, each side of which equals in length that of a link of the chain 1, and are adapted to be inserted between the edges of the chain links of maximum height as will later appear. The drums have their axes extending in horizontally and arranged vertical planes spaced beyond the ends of the press by, a distance which is an integral multiple of the length of each link. Each arris of a polygonal drum 2, as it attains its highermost elevation, is positioned in a common horizontal plane with the upper leaf of the lower chain.

The endless chains 1 and 4 are each comprised of a series of interpivoted links, there being one type of link for each chain. The links 7 of the lower chain 1 are relatively long while the links 8 of the upper chain 4 are relatively short to impart greater flexibility to the upper chain. The links are each formed with one hole at one end and a pair of longitudinally aligned holes at the other end, which is rounded at the base. The chains are constituted by longitudinal lines of links in which the link of alternating lines are facing in different longitudinal directions. Furthermore, the alternating lines are longitudinally offset or shifted with respect to one another to form an interleaved or interdigitated arrangement of the links in which transverse aligned rows of holes are formed. This arrangement is most apparent from a consideration of FIG. 2*a* wherein a portion of the chain is shown in greater detail. The arrangement is such that three transversely extending pins 100 serve to connect the lines of links at each transverse zone, where the links are in end to end relation. The outer pins of the three join adjacent links together by passing alternately through one of the holes in the ends of the links in which the two holes are provided and the hole in the adjacent link. The middle pin passes alternately through the aligned other holes in the ends of the links in which the two holes are provided and enable pivoting of the chain about the middle pins. The links are rectangular or square in cross section and may be made of rolled or cold-drawn steel for accurate compression work. The links as shown in FIGURE 2 form a chain having a substantially smooth surface and wherein the outermost links 9 and 10 have a somewhat increased vertical dimension so as to provide projecting guide ribs as best seen in FIG. 6 for imparting an accurate guiding action to the chain on displacement over a train of rollers as later explained.

The under chain unit 1, which forms the lower compression surface of the press, has its upper leaf supported throughout the major part of its length upon a train of rollers 11 dimensioned to support considerable loads. The diameters of rollers 11 and 20 are selected as large as possible since the resistance to forward motion of the material is inversely proportional to the roller diameter.

The rollers 11 and 20 roll freely upon the lower and upper table surfaces between removably provided guides 16 of substantial vertical extent which serve as a guide means to prevent undesirable lateral deflection of the chains.

The press tables are, in the construction shown, provided as double-T rail sections 12 and 23 with reinforcing ribs 13. The lower table 12 is supported on twin pairs of H-sections 14 resting with their ends upon the concrete bed 15. The upper table 23 is supported by transverse beams 19, which have connected thereto a return channel 21 for the roller train 20, and also a framework 24 supporting actuating mechanism for screw-jacks 25 serving to adjust the vertical elevation of the upper press table above the lower press table in accordance with the thickness of the material to be compressed. This actuating mechanism comprises a shaft 26 and dual bevel gears and is driven from a motor 27 from which movement is transmitted to the adjusting screws 25 which latter cause vertical displacement of nuts 25′ connected with the upper press table.

Screw tension rods 22 are provided for withstanding the high pressures developed on the upper press table during operation, and, for this purpose, the rods 22 support nuts which, after each vertical adjustment of the upper table, are blocked firmly against the upper faces of the beams 19.

The upper chain unit 4 is supported at its ends on the sheaves 5, the rotational shafts of which are supported from the upper press table 23. The foremost or "upstream" sheave is mounted at a somewhat greater vertical elevation than the rearward sheave to facilitate insertion of the stack of laminations P into the press, and the lower leaf of the upper chain is engaged beneath the roller train 20. As already mentioned, the roller train is led back to its starting position by way of an overhead channel 21.

It may already be observed that the press thus constructed is of an extremely simple basic design and is capable of withstanding high operating pressures, since its components are simple and robust and easily serviced.

FIGURE 8 illustrates a modified form of link. For most purposes, a link of this kind can conveniently be made from square or rectangular drawn steel stock of standard dimensions, the only machining operations required involving milling the end surfaces and drilling. The holes receiving the link pivots may be internally fitted with sintered bronze or steel ring bearings or needle bearings, further to reduce wear at the pivots. The links may be formed with a small taper angle at one end as shown at *a* in FIG. 8 to permit decompression of the material during pressing, and further additional holes 30 may be drilled for insertion of reinforcing pins serving to retain the adjacent links in tightly assembled relationship. The round-off *r* is required to permit the chains to pass around the end drums and sheaves.

FIGURE 9 illustrates the manner in which the links of FIGURE 8 are assembled together. As already mentioned with reference to FIGURES 3 and 4, every other longitudinal row of links is turned over.

The resulting chain surface will be seen to be made up of a multiplicity of separate elementary flat surfaces, thereby preventing the occurrence of permanent deformations as a result of irregular compression and damage to the materials being processed.

FIGURE 10 illustrates schematically another form of link usable according the invention, wherein the ends of the adjacent links are shaped as a mortise and tenon joint, whereby a fewer number of larger size links may be used.

The chain links of the chains in active position in the press operate as girders or beams resting on at least two spaced supports. The length of the links is preferably selected greater than about 1.5 times the spacing between the points of support, which points are represented by the contact generatrices of the rollers 11 or the like. The vertical dimension of the link should be sufficient to prevent sag between the spaced supports. The spacing should be kept as large as consistent with the crushing strength of the rollers, it being observed that said spacing must be selected with due regard to the diameter of the rollers which, in turn, as previously noted, should be as large as possible.

Since the chains generally have also to impart feed displacement to the material, it is preferred, according to the invention, to ascribe this latter function exclusively to the lower chain unit. For this reason, the dimensioning of the lower and upper chains differs. Since the lower chain is generally displaced over a strictly flat and rigid surface, the lower chain links are provided with an enlarged cross section so as to be able to withstand higher tension stresses, and are also longer, this facilitating entrainment of the lower chain by means of the polygonal drums as already described.

The lower drive chain is generally subjected to high tension stresses and hence the number of links provided transversely across the chain is preferably increased to reduce the shear imposed on the pivots connecting each link. Hence, the width of each link is made as low as possible, except as regards the outermost or side links which serve a guiding function as described earlier.

The upper chain, since it does not exert a drive function, may be made of much smaller links, thereby imparting thereto increased flexibility. The links are made short so as to conform more readily to the curvature of the upper press surface; the length of said links should not, however, be less than about 1.5 times the spacing between supports so as not to impair the rigidity of the active part of the chain. For high operating pressures, the links should be made from high-tensile spring steel whereby the links can operate as spring strips in the arcuate portions of their paths. The upper chain, as already indicated, is advanced by the action of the material being produced. To start the press in operation, an auxiliary motor may be provided which acts on one of the supporting sheaves of the upper chain or alternatively, one of said upper sheaves may be temporarily connected, as by a chain drive, with the adjacent lower drum. To avoid scouring or other damage to the material, the links, especially those of the upper chain, may have a special shape imparted to them whereby said links are formed at their ends with circular portions as seen longitudinally, respectively directed inwards and downwards; thus, when joined, the circular boss of one link may fit snugly into a circular socket of the other end of the adjacent link.

According to an important characteristic of the press of the invention, pressures are transmitted from the press tables to the chains between which the material is passed by way of independent antifriction elements such as rollers, balls, or the like. When rollers are used, their length should be carefully adjusted to provide minimum clearance between the inner faces of the lateral guides and the end faces of the rollers, and the roller diameter should not be less than about one fifteenth of their length in order to avoid excessive lateral pressure due to deflection forces acting on the faces of said rollers.

It is also desirable that the height dimension of the lateral guides, both on the press tables and the chains, should approximate as closely as possible one half the roller diameter in order to provide as large lateral guiding areas as possible.

The arrangement of the invention wherein the rollers are placed in a moving linear array without any connection between the adjacent rollers and guided as indicated above, said rollers having relatively large diameters, is especially rugged, strong and economical and is especially well-suited for use with low-speed presses operated at high pressures. However, such an arrangement may present the following drawbacks. First, adjacent rollers are liable to contact one another along a generatrix and hence the tangential motions of the adjacent rollers at such common generatrix are opposed or reverse to each other, thereby resulting in considerable friction. Moreover, the channel serving to return the rollers must, in this case, be very accurately dimensioned with regard to the dimensions of the rollers to avoid a risk of jamming. These difficulties may be averted by using cages 36 somewhat similar to the retainer cages used in connection with antifriction bearings, as shown in FIGURES 13 and 13*a*. The cages are articulated at 37 to permit angling during the return path of the balls or rollers. With the use of such retainer cages, objectionable friction between adjacent rollers is averted and the return channel may in some cases be dispensed with.

In the arrangement shown in FIGURE 11, the press tables 23 and 12 are formed with grooves or depressions between the guide elements 31, which are preferably removable. The chains moreover include guide links 32 of increased height.

FIGURE 12 illustrates the possibility of using balls 33 rather than rollers; grooves 34 are preferably formed both in the table and the links, of equal arcuate radius to the balls. Such an arrangement, with the balls spaced by retainer cages as previously described, may have especial advantage in connection with high-speed and relatively low-pressure presses, since lateral friction between the guides is thereby eliminated.

FIGURES 14 and 15 illustrate a form of embodiment of the antifriction elements of the press designed to form a continuous chain, thereby eliminating the friction effects mentioned above between adjacent rollers at their contact generatrices, subdividing the lateral friction forces by distributing them over a large wear surface area, and providing satisfactory guidance even in case of considerable play occurring as the result of wear on the side surfaces of the rollers. This form of embodiment is especially well-suited in connection with large presses of several meters in width.

In this embodiment, auxiliary rollers 38 are interposed between the rollers 11. If the main rollers 11 have a diameter D, the auxiliary rollers would have a smaller diameter preferably in the range from $D/4$ to $D/3$. The auxiliary rollers (see FIGURE 15) eliminate the friction between longitudinally adjacent rollers 11 by rotation of the intermediate rollers 38. Bearing links 39 provide the connection between the auxiliary rollers 38 while permitting rotation of the latter, in smooth or in antifriction bearings. Due to the use of such journal links, all the rollers including both the main and auxiliary rollers form an endless assembly, and a return channel may then be dispensed with entirely. It will further be noted that the main or carrier rollers 11 through which the auxiliary rollers 38 extend, simultaneously serve to support the latter, preventing sag thereof, and making it possible to use auxiliary rollers of small diameter in regard to length while averting the use of intermediate links which would interfere with the desirably closely-packed character of the contact lines of the carrier rollers. Some clearance must be provided between the diameter of the auxiliary rollers 38 and the bore of the carrier rollers 11. As a result of the subdivision of the rollers and the interfitted relation of the carrier rollers 11 into one another, interaction between the parts when in motion eliminates any tendency to jamming and to lateral slippage, even if there is substantial lateral clearance between the rollers. This arrangement is stronger and simpler than that using retainer cages and has the further advantage thereover of increasing the closeness of the lines of contact on the carrier rollers, an important consideration where high pressures, say above 100 kg./sq. cm., are involved. The lateral friction of the flanges of the carrier rollers 11 is distributed over a large surface area and it is hence less than if carrier rollers were used larger in length than in diameter. It is desirable that the diameter to length ratio of the carrier rollers should be as large as possible because the lateral deflecting forces on the carrier rollers are reduced as this ratio is increased. The lateral guides provided on each long side of the press tables are preferably removable so that they can readily be replaced in case of wear or damage.

The tension force to be developed is a function of the operating pressure, press table area, diameter of the ball or roller elements and the rolling and sliding friction coefficients involved. In the construction of such presses, the ball or roller diameter should be selected as large as consistent with a reasonable pressure along the lines of support of the balls or rollers. By way of example, in a press having a 20 sq. m. pressure area, a roller diameter of 100 mm. and an operating pressure of 100 kg./sq. cm., a maximum draft or tension force of about 300 tons is required. For a machine 1 meter in table width, a diameter of at least 30 mm. should be provided for the pivots interconnecting the links of the drive chain, assuming that 50 such pivot sections are simultaneously stressed in shear. The lower chain should in such case be about 50 mm. thick. The lower polygonal drive drum is driven through means such as drive chains, gear, etc. In the numerical example just given, the power required to provide a drive velocity of about 10 centimeters per second is about 400 horsepower. Preferably, a speed variator or the like is provided for automatically regulating the feed velocity in accordance with the rate of delivery of materials to the press and possibly with the time required for the laminate to set or polymerize.

At the input and output ends of the upper leaf of the lower chain unit, laterally mounted rollers may be provided to maintain the chain in proper position and oppose up-and-down motions of the chain resulting from the polygonal shape of the drive drums. In this connection, it will generally be found satisfactory to position the polygonal drums at a distance from the ends of the press table not less than about 4 to 5 times the length of a link. Preferably, said distance is an integral multiple of the link length to avoid an overhanging condition of the links especially at the outlet end of the press. The polygonal drums are preferably slightly displaced in a downward direction so that the edges of the drums, when at their uppermost positions, will be somewhat spaced from the surface of the material being produced. This avoids scouring the material as would otherwise occur on rotation of the links about their pivots, when the links' ends rise slightly above the plane defined by the compression surface of the chain.

A material feed system using traction of the material with endless chains driven by polygonal drums, as here disclosed, is capable of transmitting considerable force with only a small amount of wear on the component parts. However, it presents the drawback that the advance rate of the compression chains is subjected to cyclic fluctuations, however quite small, and also to small up-and-down movements as already noted and as a consequence of which the drive drums have to be positioned a relatively large distance beyond the ends of the press.

One desirable way of eliminating these drawbacks, especially in moderate-pressure presses, is to arrange for driving the material from the roller trains themselves rather than from the compression chains. For this purpose, endless roller train assemblies are provided which are similar to conventional endless chains using multiple sets of rollers, except that the height of the links is less than the roller diameter. The endless roller assemblies are mounted on multiple sprocket assemblies at their ends, which sprocket assemblies are power driven. It should be noted however that the tension force required to be exerted on such roller chains will be twice as great as that required to advance the material at an equal rate using the polygonal drive drums described above, since the linear velocity of the roller assemblies is half that of the endless chains.

When required to apply considerable draft forces to the roller chains for advancing the stock, the following arrangement may be used which is especially advantageous with slow acting presses. The lower endless roller assembly of the press is provided in the form of a train of rollers equal in width to the distance between the inner faces of the lateral guides on the lower press table, but the ends of said rollers are extended in both directions and are made to pass, in the active section of the press, through a space provided therefor between the lateral guides of the lower table and the lateral guides of the upper leaf of the lower compression chain unit. Each end of each roller, the diameter of which is less than the diameter of the cylindrical pressure-taking mid-section thereof, receives a sprocket keyed or otherwise secured thereto. The sprockets are actuated within the active portion of their path through the press by the upper leaf of a conventional endless roller chain positioned on each longitudinal side of the press and sliding through a channel carried by the lower press table and equal in length thereto. Both endless chains are driven from the sprockets positioned at each end of the guide channel, as mentioned above, which serve to support the upper leaves of said sprocket chains at a constant spacing from the lower compression surface of the material, and actuate the sprockets of the carrier rollers in a manner similar to the actuation of a gear by a rack, i.e. by tangential action against the lowermost arcuate portion of said sprockets in the active section of the press. Both chains, the upper leaves of which thus act as racks, form loops contained within the larger loop described by the lower roller assembly. In this arrangement, each roller is connected to the adjacent roller by links preferably positioned outside the lower press table (when considering the active portion of the system) and inwardly of the sprocket chains, so as to permit interposing between two drive rollers one or more rollers serving exclusively as carrier rollers. Although this arrangement is somewhat more complicated, it is of especial advantage in the case of very high pressures and slow speeds. One outstanding advantage of it is that the draft force required to advance the material may thus be distributed over the length of the press without exerting any traction stress upon the compression chains or upon the roller assemblies. The stress applied to the rack chains may be further reduced by making the ratio between the sprocket diameters and the carrier roller diameters as large as possible.

FIG. 16 relates to a desirable modification of the endless roller means of the type described above and illustrated in FIGS. 14 and 15. In this modification, the auxiliary rollers 38 previously described (FIGS. 14 and 15) are not rotatable, but have rotatably mounted thereon auxiliary sleeves or bushings 40 which rotate to provide a rolling contact with the carrier rollers 11. This improved arrangement eliminates the use of the journal-links previously described. Ordinary links 39 are preferably disposed in the runways as shown in FIG. 16. Labyrinth seals 53 may be provided as shown to provide fluid tightness.

What I claim is:

1. In a press adapted for compressing material, the provision of upper and lower tables having spaced and opposed surfaces, said tables being provided with guide means, endless trains of anti-friction members supported on said surfaces and guided laterally thereof by said guide means, and endless chains encircling said tables and extending parallel thereto, the chains being in contact with said anti-friction elements and being adapted for being advanced along said tables for compressing material located between the tables, said chains comprising links of elements having rectangular cross sections, each link having opposite ends and being provided with a single hole at one end and a pair of holes at the other of the ends, all said holes being arranged along a straight line, said chain being constituted by longitudinally arranged parallel lines of links, the links in the lines being in end to end relation; with the ends of the links with one hole being adjacent the ends of the links with two holes, the links in alternating lines of the chain facing in opposite longitudinal direction, adjacent lines of links being longitudinally offset from one another to form an interdigitated arrangement of links wherein the holes therein are transversely aligned and pins extending through the transversely aligned holes of the links to couple the links together to form said chain.

2. A press comprising upper and lower tables having spaced and opposed surfaces, said tables being provided with guide means, trains of anti-friction members supported on said surfaces and guided laterally thereof by said guide means, endless chains extending parallel to said tables and in contact with said anti-friction elements, the chains being adapted for being advanced along said tables for compressing material located between the tables, said chains including links of elements having rectangular cross sections, each link having opposite ends and being provided with a single hole at one end and a pair of holes at the other of the ends, all said holes being arranged along a straight line, said chain having longitudinally arranged lines and transversely arranged rows of links, the links in the lines being in front to back relation so that the ends of the links with two holes are adjacent the ends of links with one hole, the links in adjacent lines facing in opposite directions and being longitudinally offset from one another so that each end of the links with two holes has a hole thereof aligned with a hole in separate adjacent links of adjacent lines whereby an interleaved arrangement of links is provided, and pins extending transversely through aligned holes of said links to couple the links together to form said chain.

3. A press according to claim 2, wherein the anti-friction members are interconnected, comprising retainer cages including portions interpivoted between said anti-friction members and spacing the latter.

4. A press as claimed in claim 2 wherein said anti-friction members are arranged in rows for being advanced in a longitudinal direction, said members in each said row being constituted by a plurality of cylindrical rollers in endwise relation.

5. A press as claimed in claim 4 further comprising a plurality of spaced transverse auxiliary rollers, said cylindrical rollers in each row being rotatably supported on one of said auxiliary rollers, adjacent cylindrical rollers being in interdigitated endwise relation with each cylindrical roller being in rolling engagement with an adjacent auxiliary roller.

6. A press as claimed in claim 4 further comprising a plurality of spaced transverse auxiliary rollers, one for each row of cylindrical rollers, said cylindrical rollers in each row being rotatably supported in spaced transverse relation on a corresponding auxiliary roller, to permit cylindrical rollers on adjacent auxiliary rollers to enter therebetween and contact the supporting auxiliary roller.

7. A press as claimed in claim 2 wherein at least one train of anti-friction members is an endless transmission chain constituted by a plurality of rollers, the height of the links being less than the diameter of the rollers, lateral guide ribs for said chain engaging the members at the ends thereof, said links having a width which is equal to the spacing between the guide ribs.

8. A press as claimed in claim 2 wherein said anti-friction members are of circular shape and said chains include lateral guide ribs engaging the anti-friction members at the ends thereof.

9. A press as claimed in claim 2 wherein said guide means is constituted by longitudinally extending grooves in tables, corresponding grooves being provided in said links, said anti-friction members being supported in said grooves to guide chains as the same advance along said tables.

10. A press as claimed in claim 9 wherein said anti-friction members are balls which are engaged in said grooves.

References Cited in the file of this patent

UNITED STATES PATENTS

| | | |
|---|---|---|
| 814,987 | Richardson | Mar. 13, 1906 |
| 1,218,559 | Hullinger | Mar. 6, 1917 |
| 1,326,231 | Van Raalten | Dec. 30, 1919 |
| 1,787,821 | Halls | Jan. 6, 1931 |
| 2,281,860 | Renault | May 5, 1942 |
| 2,305,525 | Gustin | Dec. 15, 1942 |
| 2,546,476 | Schefe | Mar. 27, 1951 |
| 2,908,600 | Nicholson | Oct. 13, 1959 |
| 2,915,171 | Peck | Dec. 1, 1959 |

FOREIGN PATENTS

| | | |
|---|---|---|
| 472,419 | Germany | Mar. 1, 1929 |
| 1,004,368 | Germany | Mar. 14, 1957 |